United States Patent Office 2,999,754
Patented Sept. 12, 1961

2,999,754
COMPOSITION AND METHOD FOR THE PREPARATION OF BEVERAGES
Robert M. Lauck and Arthur Dock Fon Toy, Park Forest, Ill., assignors to Victor Chemical Works, Chicago, Ill., a corporation of Illinois
No Drawing. Filed Nov. 3, 1959, Ser. No. 850,545
9 Claims. (Cl. 99—78)

This invention relates to solid compositions and a method for preparing beverages. More particularly, it relates to powdered solid beverage-forming compositions having improved stability and resistance to deterioration in storage.

Solid beverage-forming compositions are well known in commerce. Such compositions typically consist of a mixture of a sweetening agent, an acidulent, and one or more flavoring agents. Generally, a fruit acid, such as citric acid, is the acidulating agent employed in commercial preparations. Preparations of this type are generally mixtures of sucrose, dextrose, citric acid, flavoring and coloring agents, in the form of a dry powder which is capable of being dissolved in water to form a desirably tangy and easily prepared beverage. In many cases the powdered preparations are packaged in small paper envelopes suitable for making up definite convenient volumes of the beverage. However, such preparations are not entirely satisfactory because the hygroscopic nature of the citric acid or other fruit acids causes the preparation to cake or deteriorate to such extent that care must be taken to avoid storage of the packages in warm or humid places.

It has now been found that phenylphosphonic acid, which has the structural formula

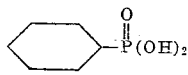

may be used to replace, with considerable advantage, all or part of the citric or other fruit acid usually employed in the preparation of powdered beverage-forming mixtures. Powdered beverage-forming preparations using phenylphosphonic acid as the acidulent are non-hygroscopic and more highly stable against moisture pickup, caking and heat deterioration in hot, humid atmospheres than are the presently known beverage preparations. Another advantage lies in their more rapid and complete solubility in cold water.

A preferred embodiment of the improved solid beverage-forming composition of the present invention comprises a mixture of phenylphosphonic acid and a flavor-base mixture composed of flavoring and coloring materials distributed in a relatively high proportion of dextrose monohydrate. This mixture is non-hygroscopic, readily soluble in cold water and stable against deterioration and caking for relatively long periods of storage in hot, humid atmospheres.

In the formulation of the powdered beverage-forming mixtures of the invention the proportions of the various ingredients are selected on the basis of the taste effect to be produced by dissolving a convenient weight of the mixture in a predetermined amount of water. For example, an individual sized package of the mixture having a weight within the range of about 0.5–1.0 ounce should contain sufficient amounts of flavoring, coloring and acidulating agents to produce a convenient amount of the beverage, say, about two quarts. The amounts of coloring and flavoring agents to be employed are not at all critical and depend entirely on the color and flavor of the beverage it is desired to produce. Generally, the amounts of these agents are so small that a carrier agent is needed to aid in their distribution or dispersion in the beverage, as well as to act as a filler to give a convenient size package for ease in handling. Dextrose monohydrate is a preferred agent for such purposes, and is generally used in amounts from 10 to 20 times the weight of flavoring agents which are employed.

The amount of acidulating agent used in the mixture is somewhat more critical due to greater sensitivity of one's taste to variations in the acidity of the beverage. For example, in the presently known powdered beverage-forming mixtures of commerce employing citric acid as the acidulent the amount of citric acid used is sufficient to produce a pH value in the beverage of about 2.5 to 2.7 for the most desirable tangy taste. Based on the production of two quarts of beverage, this represents the use of approximately 3 to 6 grams of anhydrous citric acid.

In the beverage-forming mixtures of the present invention it has been found that the amount of phenylphosphonic acid should be sufficient to give the beverage a pH value within the range of 2.2 to 2.6, and preferably about 2.4, to produce the optimum tart, tangy taste. Based on the production of two quarts of beverage, this represents the use of about 1.0 to 3.0 grams of crystalline phenylphosphonic acid.

In producing a typical powder beverage-forming mixture of the present invention, approximately 1.2 grams of a flavoring agent such as lemon, strawberry, cherry, etc. and approximately 1.5 grams of an edible food coloring material are intimately mixed with about 15 grams of dextrose monohydrate, as a carrier and dispersing agent, and this flavor base mixture is further mixed with approximately 2.0 grams of powdered phenylphosphonic acid. The quantities here designated represent suitable amounts for a convenient size package to be used in making approximately two quarts of the desired beverage. The beverage is prepared by adding the contents of such package, together with about 250 grams of sugar, to two quarts of cold water. Obviously, the amounts of flavoring agents, coloring agents and dextrose may be varied over wide ranges depending on the color, degree of flavor and sweetness, and size of package or portion it is desired to produce. Small amounts of other ingredients such as anti-oxidants, clouding oils, buffer salts, etc. may be included in the powdered beverage-forming mixture if desired but do not contribute to the nature of the present invention.

By comparing the new beverage-forming mixture with a commercially available citric acid-containing beverage-forming mixture, it has been found that in the phenylphosphonic acid-containing mixture only about 1.9 grams of the acid is required for optimum tartness of the beverage (pH 2.4) whereas with the citric acid-containing mixture 4.5 grams of the acid is required for optimum tartness (pH 2.6). Thus, the acidity of the phenylphosphonic acid is more effectively utilized than the acidity of the citric acid.

The greater stability of the phenylphosphonic acid-containing composition is illustrated in the following manner:

Equivalent size portions of dry beverage-forming mixtures, one containing phenylphosphonic acid and one containing citric acid, were subjected, in open pans, to an atmosphere of 75% relative humidity at 90° F. for 24 hours and the mixture pickup determined. When 1.89 grams of phenylphosphonic acid was used with 17.7 grams of the flavor-base mix (about 15 grams dextrose monohydrate), the moisture pickup was only about 0.3% by weight and the product remained dry and free-flowing. In the comparative test where 4.5 grams of citric acid was used with 17.7 grams of the same flavor-base mix, the moisture pickup was 9.3% by weight and the product was a very wet, soggy mass. In further testing of the phenylphosphonic acid-containing mixture with the relative humidity increased to 85%, the product remained dry and free-flowing. These results illustrate the greatly improved stability of the dry beverage-forming composition containing phenylphosphonic acid as the acidulent.

Comparative compositions having the above-illustrated formulations were heated in sealed glass tubes for 24 hours at 140° F. In the case of the citric acid-containing composition there was considerable discoloration indicating some thermal deterioration. The product formed a soggy mass having a wet appearance. In the case of the phenylphosphonic acid-containing composition, there was no discoloration and the product remained dry, showing greatly improved stability against deterioration under the influence of heat.

It has been found that the use of a small amount of monosodium phosphate, in conjunction with the phenylphosphonic acid in the beverage-forming compositions of the invention, improves the taste or "tang" of the beverages prepared therefrom. The monosodium phosphate may be conveniently mixed with the phenylphosphonic acid in an amount of about 0.1% to 30% by weight of the mixture. The improved results attributable to the addition of monosodium phosphate in a typical beverage formulation are illustrated in the following table giving the evaluation of the taste of the beverages by a taste panel. In each case the beverage consisted of sufficient water to make two quarts of beverage, 17.7 g. of flavor base, 250 g. of sugar, and the acidulents given in the table.

Table I

| Acidulent Mixture No. | Composition of Acidulent | Percent Monosodium Phosphate in Acidulent, by Weight | pH | Flavor |
|---|---|---|---|---|
| 1 | 3.0 g. Phenylphosphonic acid. | 0 | 2.28 | Slightly tart; very slightly sharp. |
| 2 | 3.0 g. Phenylphosphonic acid, 0.4 g. Monosodium Phosphate. | 12 | 2.28 | Tart; slightly sharp. |
| 3 | 3.0 g. Phenylphosphonic acid, 0.75 g. Monosodium Phosphate. | 20 | 2.32 | Tart; very slightly salty. |
| 4 | 3.0 g. Phenylphosphonic acid, 1.1 g. Monosodium Phosphate. | 27 | 2.38 | Tart; salty. |

As mentioned above the proportions of the acidulating agent and flavor-base mix as well as added sugar may be varied over a considerable range to give mixtures suitable for producing beverages over a desirable range of taste characteristics. For example, with use of 17.7 grams of flavor-base mix the phenylphosphonic acid amounts may vary from 1.0 to 3.0 grams and produce acceptable beverages. However, with the lower amount of acidulent a more desirable tasting beverage may be obtained by slightly increasing the amount of flavor-base mix. For example, with 1.14 grams of phenylphosphonic acid per two quarts of beverage the use of from 22.5 to 25.0 grams of the flavor-base mix produces a more desirable taste in the opinion of several taste observers.

Mixtures of citric acid and phenylphosphonic acid may be used if desired, as acidulents for the dry beverage-forming compositions with the proportionate advantages of the phenylphosphonic acid being obtained.

The foregoing detailed description has been given for clearness of understanding only, and no unnecessary limitations should be understood therefrom, as modifications will be obvious to those skilled in the art.

What is claimed is:

1. A solid, water-soluble, substantially non-hygroscopic and stable beverage-forming composition comprising a flavoring agent and phenylphosphonic acid as an acidulent.

2. A solid, water-soluble, substantially non-hygroscopic and stable beverage-forming composition comprising a flavoring agent, dextrose monohydrate and phenylphosphonic acid as an acidulent.

3. The composition of claim 2 which includes monosodium phosphate in an amount not more than about 30% by weight, based on the combined weights of said phenylphosphonic acid and said monosodium phosphate.

4. A solid, water-soluble, substantially non-hygroscopic and stable beverage-forming composition comprising a flavoring agent, a coloring agent, dextrose monohydrate in an amount of about 10 to 20 times the combined weights of said flavoring and coloring agents, and a sufficient amount of phenylphosphonic acid to impart a tart, tangy taste to a beverage prepared therefrom.

5. The composition of claim 4 which contains a sufficient quantity of said phenylphosphonic acid to produce a pH of about 2.2 to 2.6 in the beverage prepared therefrom.

6. A solid, water-soluble, substantially non-hygroscopic and stable beverage-forming composition comprising the following ingredients in approximately the proportions indicated:

| | Parts by weight |
|---|---|
| Phenylphosphonic acid | 2 |
| Flavoring agent | 1.2 |
| Food color | 1.5 |
| Dextrose monohydrate | 15 |

7. A solid acidulent composition for beverage-forming compositions and the like consisting of phenylphosphonic acid and monosodium phosphate, said composition containing not more than about 30% by weight of said monosodium phosphate.

8. The method of preparing a beverage which comprises dissolving in water a sufficient quantity of the composition of claim 1 to form a solution having a pH of about 2.2 to 2.6.

9. The method of preparing a beverage which comprises dissolving in water a sufficient quantity of the composition of claim 3 to form a solution having a pH of about 2.2 to 2.6.

References Cited in the file of this patent

Text: "Hackh's Chemical Dictionary," 3rd Ed. Copyright, 1944, by McGraw-Hill Book Co., Inc., pp. 648 and 649.